W. H. PRATT.
Heater for Washing Machines.
No. 59,068. Patented Oct. 23, 1866.
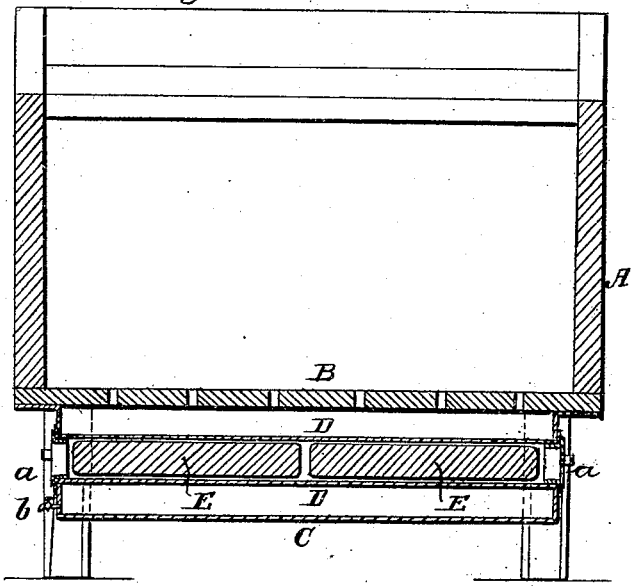
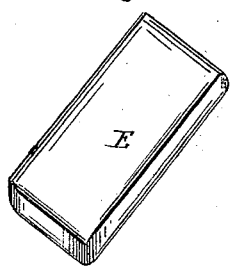
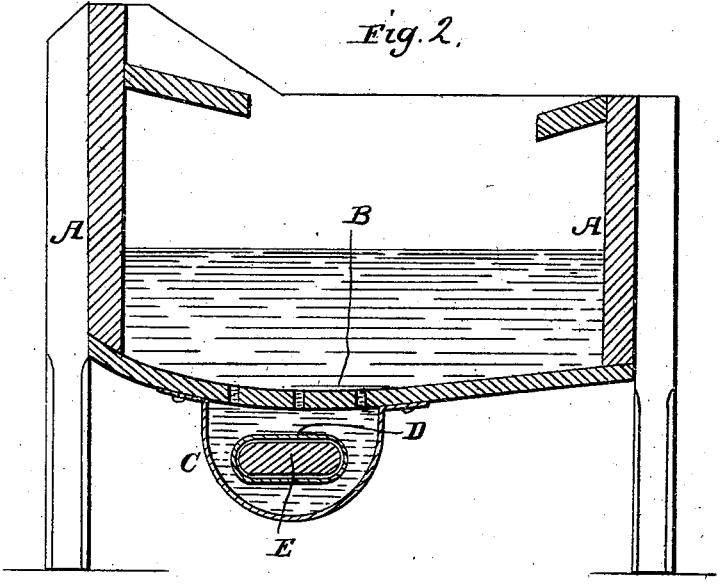
Witnesses:
Henry Sylvester
Edw Schaefer
Inventor:
W. H. Pratt

UNITED STATES PATENT OFFICE.

W. H. PRATT, OF DAVENPORT, IOWA.

IMPROVED HEATER FOR WASHING-MACHINES.

Specification forming part of Letters Patent No. 59,068, dated October 23, 1866.

*To all whom it may concern:*

Be it known that I, W. H. PRATT, of Davenport, in the county of Scott and State of Iowa, have invented a new and Improved Heater for Washing-Machines; and I do hereby declare that the following is a full, clear, and exact description thereof, reference being had to the accompanying drawings, making a part of this specification, in which—

Figure 1 is a transverse section taken in a vertical plane through the wash-box and its heater. Fig. 2 is a longitudinal section taken vertically through the wash-box and its heater. Fig. 3 is a perspective view of one of the movable heating-irons.

Similar letters of reference indicate corresponding parts in the several figures.

This invention relates to an improved mode of heating water in wooden wash-boxes, or of keeping water hot which has been heated previously to putting it into the tubs or boxes.

It consists in applying beneath the inclined bottom of a wash-box a metallic heater, which has a circulating-apartment that surrounds a heating-chamber, and that communicates with the water in the tub, so as to serve not only for heating the water, but also as a sediment-trough, for collecting the sediment which falls to the bottom of the tub. Said heating-chamber is made so as to receive heated irons, that can be readily removed and reheated when they become cool, all as will be hereinafter described.

To enable others skilled in the art to understand my invention, I will describe its construction and operation.

In the accompanying drawings, A represents a wash-box, within which the articles are washed by any of the well-known contrivances for this purpose. This box may be made of any suitable shape and capacity, with a bottom, B, which is inclined from its ends toward the center, and which is perforated, as shown in Figs. 1 and 2, at its lowest point, for the escape of sediment.

Beneath the perforations through the bottom B is a semi-cylindrical vessel, C, which is secured water-tight to said bottom, and extends transversely across the same. This vessel is provided with heads or closed ends, and it has an elliptical chamber, D, extending through it, which leaves a space for the free circulation of water.

The ends of the chamber D are provided with doors or movable closing-caps *a a*, and the vessel C is furnished at one or both ends with stop-cocks or plugs *b*, as shown in Fig. 1, which latter will admit of the drawing off of the water and sediment from the tub A and vessel C. The cock *b* will enable a person at any time to draw off the sediment which is deposited in the bottom of vessel C, thus keeping the water in said tub comparatively clean for a long time.

The chamber D, which is surrounded by water in the vessel C, is the heating-chamber, and is adapted for receiving within it the heating-irons E, which are made of the flattened shape shown in Fig. 2, for the purpose of presenting as large a heating-surface as possible without having these irons to give off their heat too rapidly. These irons E are movable, and they can be taken out of their chamber D and heated by removing the caps *a*. When it is desired to heat water in the box A and vessel C, the irons E are heated and introduced into the chamber D, and this chamber closed by means of the caps *a*. The heat which is given off by the irons E will now be communicated to the water in the chamber of vessel C, and this will rise into the box A, so that there will be a constant circulation of water through this vessel C from and into the box A, until the temperature of the entire body of water is equal to that of the irons. The irons may now be removed and heated again, or others, which have been previously heated, can be used, so as to keep up the heat in the chamber D during the operation of washing.

Having thus described my invention, what I claim as new, and desire to secure by Letters Patent, is—

1. Arranging chambers C and D beneath the perforated bottom wash box or tub, substantially as described.

2. The combination of the heater C D, constructed as described, with a wash-tub, A B, substantially as set forth.

WM. H. PRATT.

Witnesses:
HENRY C. F. JENSEN,
THEODORE JENSEN.